United States Patent Office 3,734,850
Patented May 22, 1973

3,734,850
WASTEWATER TREATMENT SYSTEM
Fred A. Karr, Redwood City, Calif., assignor to Shasta Beverages Division of Consolidated Food Corporation, Hayward, Calif.
Filed Sept. 8, 1971, Ser. No. 178,739
Int. Cl. C02c 1/08
U.S. Cl. 210—3               10 Claims

ABSTRACT OF THE DISCLOSURE

Apparatus and method for injecting air or other oxygen-containing gas under pressure into wastewater from within a gas porous shell capable of passing gas bubbles of a size (e.g., 1–2 microns or less) for retention by the wastewater. The injection is through elements at the bottom of a sump or on stream in a recycle line to and from the sump. A bed of perforate balls on the bottom of the sump provides an excellent surface area for bacterial treatment as by coated enzymes injected into the system.

BACKGROUND OF THE INVENTION

The control of the quality of wastewater effluent from industrial plants has received an increasing amount of attention in recent years due to public concern for the environment. Perhaps the major problem in discharge of certain relatively nontoxic wastewaters, say, into large bodies of water, such as lakes and rivers and city treatment lagoons, is the biological oxygen demand (BOD) of the wastewater. Wastewater with a high BOD may consume oxygen to such an extent that it is harmful to the water fauna. Accordingly, the BOD level of wastewater has become a standard for quality.

Aeration has been employed to reduce the BOD content of wastewater. In one method, normally employed as a final step in the treatment of municipal wastes in large sewage plants, the wastewater effluent is sprayed into the air so that it retains a certain proportion of the air as bubbles. This method requires substantial available open space and is only economical where large quantities of wastewater are being processed.

Another aeration technique employed a tank of wastewater in which rotating disks are partially submerged so that the surface of the disk exposed to the surrounding air draws a certain proportion of air into the water as it submerges. This method is inefficient in the quantity of air bubbles which are injected into the water in comparison to the size and operating expense of the equipment.

Both of the above aeration techniques produce bubbles of a relatively large size which consequently are not readily retained by the liquid. Thus, a relatively large proportion of the injected air is released to the surroundings in a short period of time. These techniques provide no capability for forming a controlled steady stream of small bubbles which may be retained in a stable form in the wastewater.

Various techniques other than aeration are employed for treating wastewater. Such techniques include the addition of enzymes or other biological treating agents, and also addition of chemical treating agents. The biological agents oxidize organic material thereby reducing its BOD level. Certain chemical agents, such as lime, are employed to coagulate wastewater materials which may be separated in a settling tank or the like. These operations are conventionally performed at stages prior to aeration.

SUMMARY OF THE INVENTION AND OBJECTS

It is a general object of the invention to provide an improved wastewater treating system for decreasing the BOD of wastewater.

It is a further object of this invention to provide a system of the above type which is capable of economical performance in a confined space and which is readily adjustable to accommodate wide variances of wastewater treatment requirements.

It is a particular object of the present invention to provide a treatment system of the above type which is capable of the addition of gas containing a preselected proportion of oxygen.

It is another object of the invention to provide a wastewater treatment system operable either only as a substitution for conventional aeration or in combination with biological or chemical treatment.

These and other objects and features of the invention will become more readily apparent upon a review of the following description in conjunction with the accompanying drawings.

In accordance with the above objects, a method and apparatus has been provided for treating wastewater by the injection of an oxygen-containing gas, such as air or oxygen or mixtures of the same, into the wastewater while controlling the maximum size of the injected gas bubbles to substantially increase the adsorbed oxygen content retained by the wastewater. This control is preferably accomplished by injecting the gas into the wastewater from within a shell through a wall of predetermined porosity (e.g., 1–2 microns or less) to yield bubbles of approximately the same size.

In one embodiment of the invention, the wastewater is supplied to a sump to form a wastewater body and is removed therefrom through an exit line operable by overflowing the sump. One or more porous shells of the above type, as in the form of elongated pipes connected by a manifold to a source of pressurized gas, are mounted in the lower portion of the sump so that they are submerged below the surface of the wastewater contained therein. By fixing the porosity of the pipe walls, the size of the gas bubbles are closely controlled for increased retention by the wastewater. The gas is supplied to the porous pipes under a greater pressure than that developed by the pressure exerted by the overhead wastewater in order to provide the driving force for the injection of the gas bubbles.

In another wastewater treating system according to the invention, a sump is provided with a recycle line for withdrawing wastewater therefrom and returning the same to the sump. Oxygen-containing gas from a pressurized source is injected from within a porous shell in fine bubble form into wastewater flowing through said recycle line. In order to stabilize gas bubble adsorption, a pressurized holding tank may be provided in the recycle line downstream from the point of gas injection.

Either of the above systems may be converted into a combined system for simultaneously aerating the wastewater and either chemically or biologically treating it. For this purpose, it is preferable to provide a bed of particulate material of spherical shape at the bottom of the sump through which the wastewater is directed by the inlet line. The chemical or biological treating agents may be added directly to wastewater in the sump or, the treating agents may be added in the recycle line which, in turn, may be supplied into the wastewater inlet line. The latter system facilitates the coating of the treating agent on those particles of the bed which are in direct line with the wastewater effluent. The bed provides a highly efficient surface for coating of the biological treating agents for contact with the wastewater. In addition to providing the above function, the particulate bed serves to further break up the oxygen-containing gas bubbles to facilitate absorption and retention by the wastewater.

DETAILED DESCRIPTION OF THE PREFERRED EMBODIMENTS

Figure 1:
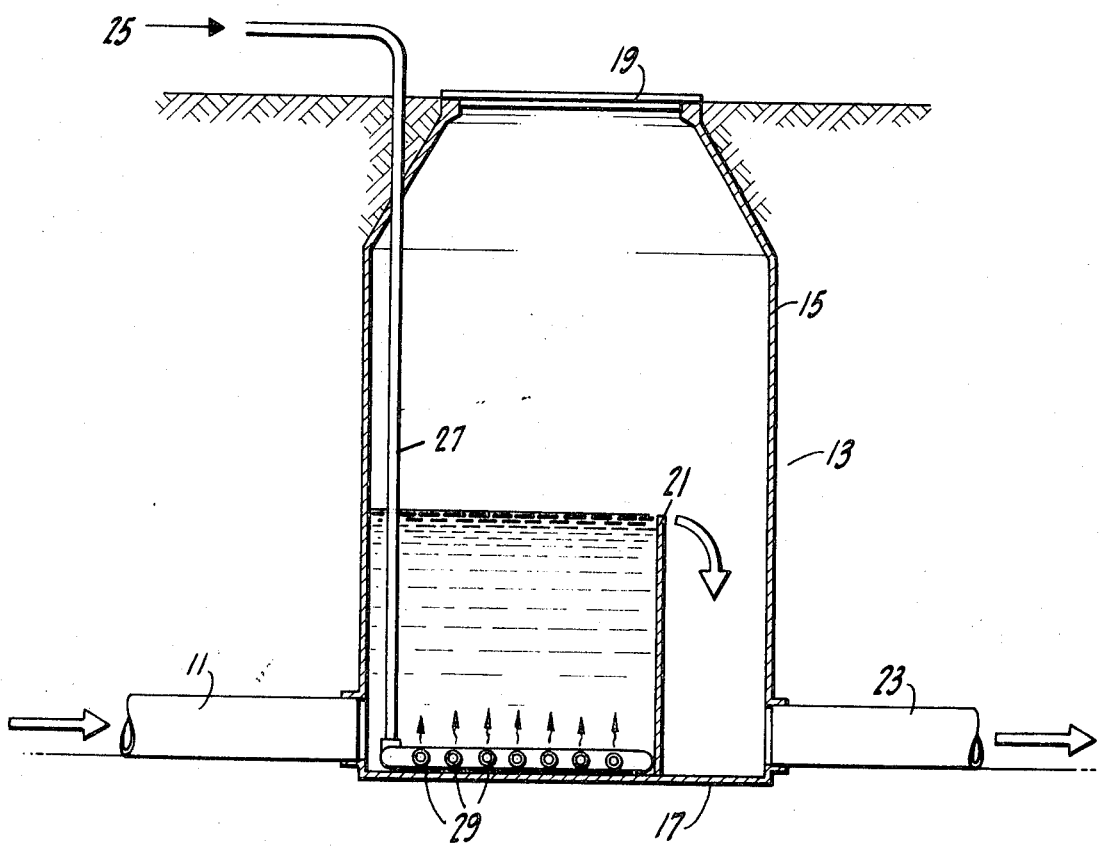
FIGS. 1 and 2 are schematic diagrams illustrating two different embodiments of wastewater treating systems in accordance with the present invention.

Referring to FIG. 1, a system in accordance with one embodiment of the present invention is shown, in which wastewater from, say, an industrial plant is supplied through a plant sewer line 11 to an underground sump 13. In this instance the sump comprises a generally cylindrical outer wall 15, a bottom wall 17, and an open top upon which is seated a removable manhole cover 19. A baffle plate 21 is mounted on bottom wall 17 to provide the desired level of wastewater in the sump. When this level is exceeded, the wastewater overflows the baffle plate 21 and is removed through exit line 23 which may be connected to a main sewer line.

An oxygen-containing gas is directed from a source 25 through pipe 27 and into means for injecting the gas in fine bubble form into a wastewater in the sump adjacent a lower portion thereof. In this case, such injection means comprises a series of parallel shells or gas injection elements 29 connected to pipe 27. Each gas injection element 29 may comprise a porous or sintered metal tube blocked at its outer end and having a pore size which is large enough to permit the transmission of gas bubbles without excessive pressure drop and small enough so that the gas bubbles are absorbed by the wastewater to provide retention of the same within the wastewater in a stable form over an extended period of time. For this purpose, it has been found preferable to employ a maximum pore size of about 1–2 microns or less, although larger sizes may also be utilized. The minute gas bubbles are quickly collapsed into solution of the wastewater under the pressure created by the overhead wastewater.

An alternative injection element 29 would comprise a flexible filter medium coating such as formed of glass microfibers bonded with epoxy resin mounted over a central gas injection supporting core. Such structure is selected to provide the same size of gas bubbles as aforementioned.

The oxygen-containing gas referred to herein normally comprises air under pressure in which case the gas injection comprises aeration. It should be understood that the proportion of oxygen in the gas mixture may be adjusted to as high as say 100% oxygen in accordance with the present invention if this is desirable to treat a particular type of wastewater.

In one particular device of the above type, sump 13 may be a vertical concrete conduit of the order of 6 feet high and 5 feet in diameter while baffle plate 21, and, accordingly, the water level is about 2½ feet high.

In operation of the above wastewater treating system, wastewater is directed through plant sewer line 11 and fills the upstream side of baffle plate 21 until it reaches a level for overflowing and removal through exit line 23 into say the main sewer line. The height of plate 21 determines the wastewater level and corresponding liquid pressure head. Pressurized oxygen-containing gas such as air is supplied through gas injection elements 29 maintained at a greater pressure than the surrounding wastewater. This pressure may be adjusted in accordance with the desired amount of aeration. There is sufficient retention time so that the injected minute gas bubbles are dispersed throughout the wastewater.

Figure 2:
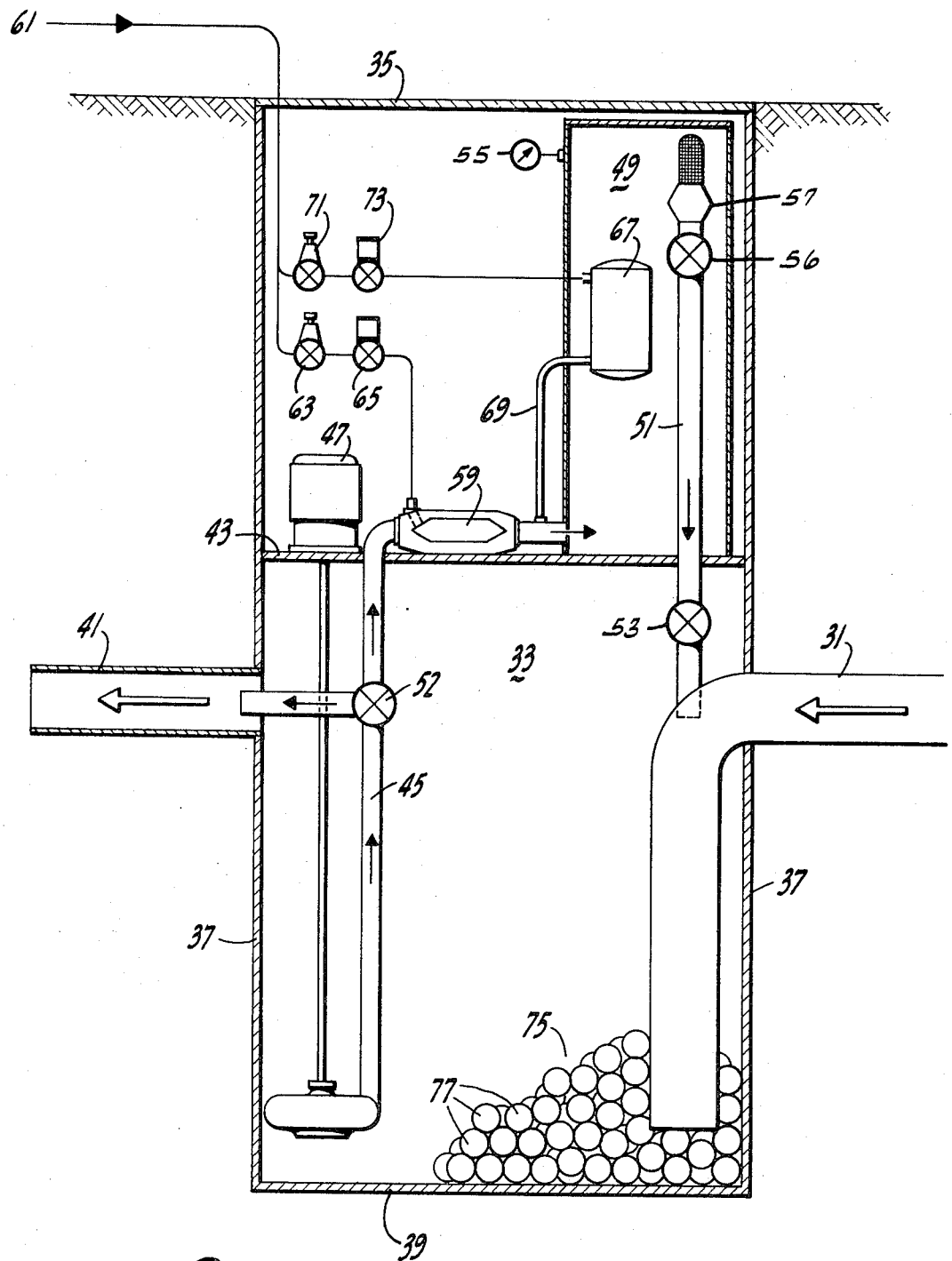

Referring to FIG. 2, another embodiment of a system for treating wastewater in accordance with the present invention is provided in which wastewater is supplied through a plant sewer line 31 which directs the wastewater downwardly into sump 33 which includes a top wall 35, side walls 37, and a bottom wall 39. An exit line 41 is provided for the removal of wastewater from sump 33 normally by overflow. As with the embodiment of FIG. 1, sump 33 may be disposed underground at the same level as a main sewer line to facilitate connection therewith. Sump 33 also includes a support platform 43 for structure to be described hereinafter.

A recycle line is provided for withdrawing wastewater from sump 33 and returning the same to the sump. The recycle line includes a sump pump line 45 into which water is drawn at a desired volume of circulation under a pressure controlled by the sump pump drive motor 47. The wastewater is urged through pump line 45 into the lower portion of holding tank 49. An outlet 51 provides communication between an opening in the upper side wall of holding tank 49 for discharge into the plant sewer line 31.

A two-way diversion valve 52 may be provided and set to discharge, if desired, directly into discharge line 41. When in this discharge position, the sump may be emptied as for maintenance work. If desired, a certain percentage of the recirculated wastewater may be discharged into the outlet line on a constant basis.

Holding tank 49 is maintained under a pressure selected to assist the stabilization of the absorbed injected gas, described hereinafter. In order to control this pressure, an adjustable pressure opening valve 53 is provided in outlet line 51 which may be set to open at the desired operating pressure. For example, if the valve is set to open at say 20 p.s.i.g. pressure, the circulating system will be under 20 lbs. of operating pressure from outlet line 51 to pump line 45. The pressure in holding tank 49 is monitored by a pressure gauge 55. The pressure in the system may be controlled by operation of a manual throttle valve 56. A visual sight valve or window 57 may be provided to monitor the system at random.

Means are provided for injecting an oxygen-containing gas into the wastewater flowing through sump line 45 and including a shell 59 having a gas porous wall and a source 61 of pressurized air or other oxygen-containing gas. Air flowing into shell 59 is controlled by an air pressure regulator 63 which can be preset for any desired volume of injected air. An air solenoid valve 65 may be provided to automatically close in response to the disengagement of motor 47.

The shape and general characteristics of shell 59 may be the same as the carbonator described in Karr U.S. Pat. 3,256,802. The pore size of the walls is preferably 1–2 microns or less for the reasons described with respect to gas injection element 29. At this size and under the pressures created in line 45, the minute air bubbles are absorbed into the wastewater. If desired, gases other than air or oxygen may be injected into shell 59. The amount of gas injection may be further controlled by a gas flow meter, not shown.

It is desirable to dispose shell 59 in a recycle line such as sump pump line 45 because of the irregular surges which normally occur in a sewer line 31 which is of a larger cross-sectional area than required for typical non-surge flow. Shell 59 would not be effective in a conduit of that size during the non-surge flow since a steady flow about the shell is optimally employed. This is accomplished under the pressure in pump line 45.

Means may be provided for urging a wastewater treating agent such as of the biological or chemical type into the sump. For this purpose, a treating agent tank 67 is mounted suitably on the side of holding tank 49 for periodically injecting agent through a line 69 into sump line 45. Air pressure regulator 71 serves to empty treating agent from tank 67 at a desired injection flow rate. An optional air solenoid valve 73 may be connected to a time clock for automatic periodic injection of the feeding solution into line 45.

Any of the conventionally known treating agents may be employed in conjunction with the present invention, depending upon the desired results. For example, biological enzymes may be employed with particular effectiveness for the reasons explained hereinafter.

A sump pump float switch, not shown, may be provided to detect the movement wastewater in the sump drops below a predetermined level and to actuate pump motor 47 in response thereto. One suitable type of switch is of the level-control electrode type.

A particulate bed 75 of suitable particles such as perforated plastic balls 77 rests upon bottom sump wall 39 to a level approximately as high as the discharge end of plant sewer line 31. The perforate balls serve to provide a large internal and external bacterial surface area in a relatively small volume for wastewater contact as it flows in an out of the balls. The wastewater, containing a high proportion of minute air bubbles, is flowing under pressure through line 51 and so is in constant contact with the bacteria coating on the surfaces of the balls. The particulate bed also serves to further break down the minute air bubbles into a smaller more stable form for long-term retention in the wastewater.

Although particulate bed 75 has been described with reference to spherical balls, it should be understood that other inert particles such as gravel or small rocks may be employed.

The above system may be provided with an auxiliary set of gas injection elements connected to source 61 and mounted to the bottom of the sump. Such elements, not shown, could be of the general type described with respect to FIG. 1. The number, size and spacing of the gas injection elements would be chosen to accommodate the size, load and nature of the wastewater to be treated.

The dimensions of a suitable system of the above type would include a sump measuring 4 feet in length and width in which a constant 4 foot head of wastewater is maintained. For such a system, exit line 41 may be 6 inches in diameter.

In operation of the system described with respect to FIG. 2, wastewater is supplied through line 31 at, say about 50 gallons per minute and fills sump 33 to overflow through line 41. A portion of the wastewater is drawn through sump pump line 45 and proceeds past shell 59 whereat minute air bubbles are discharged into the wastewater. The wastewater then flows into the bottom on holding tank 49 which is maintained under a pressure set by valve 53. When this pressure is exceeded the wastewater flows into sewer line 31 and back into the sump.

The air is supplied to shell 59 from source 61 at a pressure controlled by valve 63. The auxiliary wastewater treatment agent, such as biological enzymes, is supplied to tank 67 and urged under pressure from source 61 into line 45 for injection into the wastewater. Such enzymes form a coating on the particulate bed 75 which is disposed at the discharge end of sewer line 31 for maximum contacts with the incoming wastewater.

It is apparent from the foregoing that an improved system for injecting an oxygen-containing gas into wastewater has been provided which may be directly incorporated into a pre-existing sewer line of an industrial plant. This system has a high degree of flexibility and may be adjusted to accommodate various types and quantities of wastewater. Furthermore, it provides the ability for the efficient combination of ether chemical or biological treatment in the same zone as gas injection.

I claim:

1. A method for treating wastewater comprising forming a body of wastewater, supplying wastewater to said body, pumping a part of said wastewater body through a closed pathway and returning a substantial portion of said pumped wastewater into said wastewater body, injecting pressurized oxygen-containing gas into the pumped wastewater intermediate the ends of said pathway under conditions to control the maximum size of the injected gas bubbles to substantially increase the oxygen content retained by the wastewater, directing said gas-injected wastewater in said closed pathway to a holding tank maintained under superatmospheric pressure and retaining said injected gas in said holding tank prior to return to said wastewater body to assist stabilization of said injected gas bubbles retained by the wastewater.

2. A method as in claim 1 in which downstream from said gas injection said wastewater is directed past a totally submerged particulate bed to impede the flow of wastewater in a manner to reduce the size of said injected gas bubbles.

3. A method as in claim 1 in which wastewater supplied to said wastewater body is directed past a particulate bed in said wastewater body to impede the flow of wastewater in a manner to reduce the size of said gas bubbles.

4. A method as in claim 3 in which a wastewater treating agent of the chemical or biological type is supplied to the wastewater body in a manner to form a coating upon the particles of the bed.

5. A method as in claim 3 in which the particles are perforate balls.

6. A system for treating wastewater comprising a wastewater sump, inlet line for directing wastewater to said sump, a recycle line for withdrawing wastewater from said sump and returning the same to the sump, a source of pressurized oxygen-containing gas, means connected to said source of pressurized gas and disposed in said recycle line for injecting the gas into said recycle line in a fine bubble form, means for urging wastewater through said recycle line, a holding tank disposed in said recycle line downstream from said gas injecting means, and means for maintaining said holding tank under super-atmospheric pressure.

7. A system as in claim 6 in which said gas injecting means comprises a shell disposed within said recycle line with adequate clearance therebetween for wastewater bypass, said shell having a gas porous wall, and means for supplying pressurized gas to the interior of said shell.

8. A system as in claim 7 in which said wall has a maximum pore size of about 2 microns.

9. A system as in claim 6 including means for urging wastewater treating agent into said sump.

10. A system as in claim 6 including a particulate bed disposed within said sump adjacent the outlet of said inlet line.

References Cited

UNITED STATES PATENTS

| 3,545,731 | 12/1970 | McManus | 210—220 X |
| 3,477,947 | 11/1969 | Kappe | 210—194 X |
| 3,232,434 | 2/1966 | Albersmeyer | 210—151 |
| 3,543,937 | 12/1970 | Choun | 210—150 |
| 3,662,890 | 5/1972 | Grimshaw | 210—15 X |
| 1,326,174 | 12/1919 | Borcherdt | 209—170 X |

MICHAEL ROGERS, Primary Examiner

U.S. Cl. X.R.

210—15, 194, 220